ary Examiner*—Richard C. Queisser
United States Patent

[11] 3,599,490

| [72] | Inventors | Robert G. Love;<br>Paul A. Moore, both of Duncan, Okla. |
|---|---|---|
| [21] | Appl. No. | 840,932 |
| [22] | Filed | July 11, 1969 |
| [45] | Patented | Aug. 17, 1971 |
| [73] | Assignee | Halliburton Company<br>Duncan, Okla. |

[54] SAFETY SEAL FOR DIRECT READING FLOW METER
6 Claims, 2 Drawing Figs.

[52] U.S. Cl............................................................. 73/272 R,
 277/205
[51] Int. Cl. ................................................... G01f 15/10,
 F17j 15/32
[50] Field of Search............................................ 73/229-
 —231, 253—258, 272; 277/205

[56] References Cited
UNITED STATES PATENTS

| 2,587,405 | 2/1952 | Stevens et al. ................. | 277/205 |
| 2,884,291 | 4/1959 | Whitten......................... | 277/205 |
| 2,913,269 | 11/1959 | Bremer et al. ................. | 277/36 |
| 2,962,330 | 11/1960 | Kohl............................. | 277/205 |
| 2,997,318 | 8/1961 | Lansky et al.................. | 277/205 |
| 3,213,687 | 10/1965 | Forgues........................ | 73/258 |
| 3,384,382 | 5/1968 | Rink............................. | 277/205 |
| 3,425,275 | 2/1969 | Russell, Jr. et al............ | 73/272 |
| 2,636,479 | 4/1953 | Smyser......................... | 73/253 |

*Primary Examiner*—Richard C. Queisser
*Assistant Examiner*—Herbert Goldstein
*Attorney*—Burns, Doane, Benedict, Swecker and Mathis ABSTRACT: A seal is provided having a resilient, hollow, generally cylindrical body. An annular V-shaped groove extends longitudinally within the cylindrical body from one axial end of the seal through approximately two-thirds of the length thereof. An annular bead is formed on the inner cylindrical surface of the seal adjacent the grooved axial end. The inner cylindrical surface extends generally parallel to the axis of the overall configuration of the seal. The outer cylindrical surface of the seal also extends parallel with the axis from the nongrooved axial end to a point along the length of the seal midway between the two axial ends. From this midpoint to the grooved axial end, the outer cylindrical surface diverges from the axis of the seal. When the seal is disposed about a rotatable shaft, the only friction between the two is generated along a circumferential contact line defined by the outer periphery of the annular bead. A pressure differential applied across the seal forces the sides of the groove apart and urges a substantial portion of the inner surface of the seal against the shaft so as to apply a braking force thereto. The fluid tightness of the seal is directly proportional to the pressure differential applied thereacross.

PATENTED AUG 17 1971                    3,599,490

INVENTORS
ROBERT G. LOVE
PAUL A. MOORE

BY
Burns, Doane, Benedict, Swecker & Mathis
ATTORNEYS

SAFETY SEAL FOR DIRECT READING FLOW METER

BACKGROUND OF THE INVENTION

The present invention relates to a resilient safety seal for use with a rotatable shaft, and more particularly, the invention is directed to a special sealing and braking device for use in an inner magnet chamber of a direct reading flow meter.

Direct reading flow meters are used in many diverse environments such as on offshore oil recovery sites and in agricultural irrigation systems. Very often such meters are used to indicate the flow of fluids which would be damaging to the environment of the flow meter if the fluid should be permitted to escape from the housing thereof.

In a direct reading flow meter of the magnetically coupled type, leakage is likely to occur when the inner magnet chamber is ruptured due to a bearing failure. When the somewhat insubstantial wall of the inner magnet chamber fractures, the chamber comes into direct communication with the fluid to be flow-monitored. The fluid is then free to force a flow path through the inner magnet chamber, to invade the tachometer mechanism chamber near the face of the flow meter, to pop out the viewing glass and, ultimately, to flow into the environment surrounding the flow meter.

If the oil should escape from a flow meter mounted on an offshore platform and gush onto the surrounding sea, severe damage may be suffered by sea life and beach owners alike. If the direct reading flow meter should be connected into a farmer's irrigation system and the flow meter should similarly fail, it may result in flooding unless the farmer is given some indication of the failure in time to open a bypass.

To compound the problem, it is common to position direct reading flow meters in remote locations. such meters may be checked infrequently as when an odometer is the primary indicator on the meter and need be monitored only once a day. If an inner magnet chamber failure should occur under these circumstances, a mere indication of the failure may be insufficient to avert damage. If a seal were included in the inner magnet chamber, which seal permitted the shaft to continue to rotate at a high speed, the motion of the shaft in combination with the high pressure differential across the seal could reduce the effectiveness of the seal to a point where the fluid might escape from the meter regardless of the presence of the seal.

In order to avoid these detrimental results, it would be advantageous to provide a sealing device which would not only give indication that an inner magnet chamber has been ruptured but which would substantially regard or even freeze the motion of the included shaft and, simultaneously, form a fluid-tight seal therewith having a sealing force directly proportional to the fluid pressure differential across the device.

OBJECTS AND SUMMARY

It is therefore an object of the present invention to provide a means for preventing contaminating fluid from escaping from a direct reading flow meter to a surrounding environment.

It is another object of the present invention to provide a sealing device for use with a rotatable shaft which device applies a minimum of friction to the shaft under normal operating conditions.

It is still another object of the present invention to provide a sealing device for use with a rotatable shaft which device is actuated to apply a substantial braking force to the shaft in response to a minimum pressure differential applied across the sealing device.

It is a further object of the present invention to provide a sealing device which becomes more effective as a pressure differential across the device is increased.

It is a still further object of the present invention to provide a sealing device for use with a rotatable shaft which device is easy to manufacture and requires a minimum of effort to install within a housing containing the shaft. The aforementioned objects of the present invention are carried out providing a seal having a resilient, hollow, generally cylindrical body. A first axial end of the seal is formed with an annular V-shaped groove which extends axially through a substantial portion of the length of the cylindrical body. An annular bead is formed on the inner cylindrical surface of the seal adjacent the first end thereof which bead makes a line contact with a rotatable shaft extending axially through the center of the seal. The outer cylindrical surface of the overall hollow cylindrical configuration increases in diameter from a point midway between the two axial ends of the seal to the first axial end thereof.

In one feature of the invention, the radial distance between the inner and outer cylindrical surfaces may be approximately one-fifth the axial length of the seal.

In another feature of the invention, the axial extension of the V-shaped groove may be two-thirds as long as the axial length of the seal.

Due to these dimensional relationships, the inner cylindrical surface of the seal operates to forcibly engage a rotatable shaft disposed therethrough so as to retard the movement thereof in response to a minimum pressure differential applied across the seal.

DRAWINGS

While the invention is particularly pointed out and distinctly claimed in the concluding portion of the specification, the structure and operation of the preferred embodiment may best be understood by reference to the following detailed description taken in connection with the accompanying drawings in which:

FIG. 1 is a sectional view of a preferred embodiment of the present invention installed within an inner magnet chamber of a direct reading flow meter; and FIG. 2 is an enlarged sectional view of the sealing device shown in FIG. 1 used in combination with a rotatable shaft.

DETAILED DESCRIPTION

Figures 1, 2:
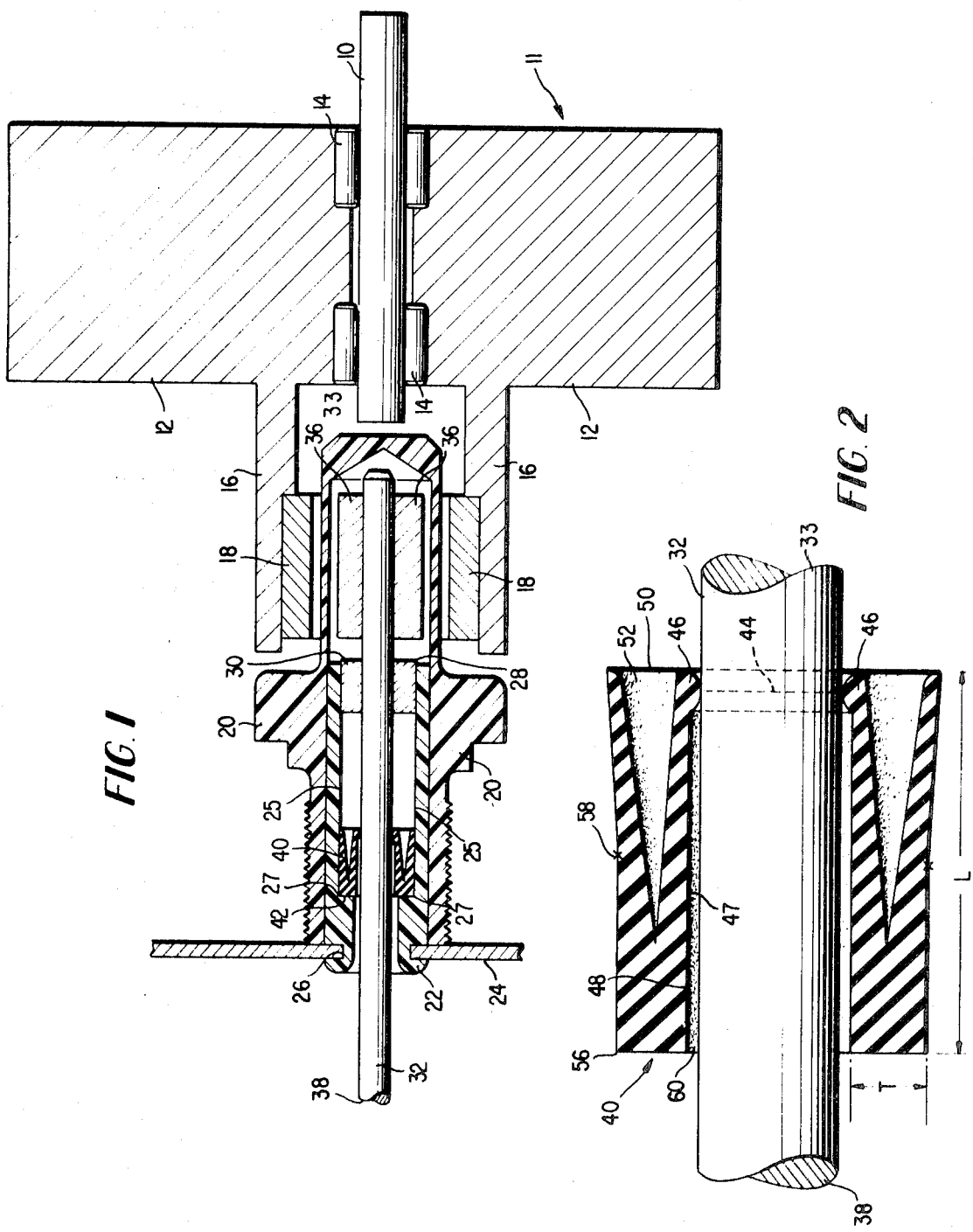

Referring now to the drawings in which like numerals are used to indicate like parts throughout the various views thereof, FIG. 1 shows the essential elements of a direct reading flow meter incorporating the sealing device of the present invention.

A stationary shaft 10 rotatably supports a rotor 11 having blades 12 journaled to the shaft 10 by means of bearings 14. Arms 16 are formed on the blades 12 of the rotor and are utilized to support primary magnets 18. The blades 12 are directly acted upon by a moving fluid (not shown) which is to be flow-rate monitored and which flows normal to the axis of the shaft 10. The rotation of the blades 12 causes the rotation of the primary magnets 18 about the extended axis of the shaft 10.

An inner magnet chamber is formed by a magnet housing 20 which is generally cylindrical and hollow in configuration. The axis of the cylindrical inner magnet housing 20 is disposed coincident with the axis of the fixed shaft 10. The housing 20 is mounted on a bushing 22 by means of a heat shrink fit or a threaded engagement (not shown). A vertically disposed plate 24 is provided and defines the base of a tachometer mechanism (not shown). The plate 24 is formed to define a central aperture 26 and the bushing 22 is mounted within the aperture 26 with the axis of the bushing normal to the planar extension of the plate 24. The bushing 22 is formed of a generally cylindrical, hollow configuration with the outer cylindrical surface thereof generally parallel with the central axis of the bushing 22. The inner cylindrical wall of the bushing 22 is formed with an annular recess 25 which extends from a point approximately one-quarter the distance along the length of the bushing from the baseplate 24, through the remaining length of the bushing, to the opposite axial end 28 thereof. A bearing 30, of the babbitt type, is mounted within end 28 of the bushing 22 and is used to support a rotatable shaft 32 therein.

One end 33 of the rotatable shaft 32, which end is adjacent the bearing 30, is provided with secondary magnets 36 which magnetically couple with the primary magnets 18 through the inner magnet chamber housing 20. The other end 38 of the shaft 32 is connected with the tachometer mechanism (not shown) at the forward end of the overall meter. An annular, generally cylindrical, hollow, resilient seal 40 is disposed about the rotatable shaft 32 and is located within the annular recess 25 formed within the bushing 22. The seal 40 is provided with one solid annular axial end 42 which abuts against a shoulder 27 formed at one end of the bushing recess 25. The shoulder 27 prevents the seal 40 from moving axially toward the vertical plate 24. The details of the annular, hollow seal 40 may best be understood in connection with FIG. 2.

Referring now to FIG. 2, the rotatable shaft 32 is shown disposed within the seal 40.

It will be noted from FIG. 2 that, during normal operation, the only friction generated between the seal 40 and the rotatable shaft 32 is along a line of contact 44 extending transversely of the axis of the shaft 32 adjacent end 33 thereof. This line contact 44 is made between an annular bead 46 formed on the inner cylindrical surface 47 of the seal 40 at axial end 50 thereof. An annular V-shaped groove 52 is formed within the cylindrical body of the seal 40 and extends longitudinally within the body from axial end 50 thereof with the open portion of the groove 52 adjacent the axial end 50. The inner cylindrical surface 47 of the seal 40 extends longitudinally and generally parallel with the axis of the overall cylindrical configuration of the seal 40 and of the shaft 32 disposed therein. The outer cylindrical surface 48 of the seal 40, similarly, extends parallel with the axis of the cylindrical configuration of the seal 40 and the shaft 32 disposed therein from axial end 56 of the seal 40 to an approximate axial midpoint 58 along the length of the seal 40. From midpoint 58 to the axial end 50 of the seal 40, the outer cylindrical wall increases in diameter so as to diverge from the axis of the cylindrical configuration of the seal 40 at a slope of about .05 inch per inch.

Referring again to FIG. 1, it can be seen that the divergent portion of the outer cylindrical surface of the seal 40 between midpoint 58 and the axial end 50 insures a fluidtight fit of the seal 40 within the annular recess 25 of the inner magnet chamber housing 20. This configuration precludes having to compress the entire seal and forcing the same within the recess 25 as must be done with many existing safety seals. The diameter of the seal at end 58 may be approximately coextensive with the inside diameter of the recess 25 of the magnet chamber 20. Therefore, the seal 40 may be plugged into the recess 25 by merely forcing it axially into the bushing 22 toward the tachometer mechanism portion of the meter. Hence, the seal may be installed without contracting the whole seal from a greater diameter than the inner diameter of the recess 25 to allow its insertion and subsequent expansion within the recess 25.

To install the present invention, end 54 of the seal 40 is inserted within the recess 25 and the seal is forced axially along the annular recess until end 56 comes into abutting engagement with the shoulder 27 formed at the forward end of the recess 25. The divergent nature of the end 50 of the seal 40 provides a fluidtight fit at end 50 around the periphery of both the bead 46 and the outer surface 48. It will be seen that, in this manner, a clearance of any desired tolerance may be provided in space 60 between the inner annular surface 57 of the seal 40 and the rotatable shaft 32 the dimensions of which space 60 may be ensured if the entire seal were compressed and then forced into the recess 25. Since it is imperative to have a minimum of frictional contact between the seal 40 and the shaft 32 during normal meter operation, the provision of space 60 is significant in that it ensures that there will ordinarily only be the line contact 44 between the bead 46 and the rotatable shaft 32.

The body of the seal 40 consists of a resilient substance, such as rubber, and the dimensions of the seal should be such as to ensure that the V-shaped groove 52 is readily distorted upon the application of a minimum threshold of pressure differential across the seal 40 of high to low pressure from axial end 50 to axial end 56. Therefore, the V-shaped groove should be of substantial depth in relation to the axial length of the overall seal configuration. This not only makes the seal more pliable but also presents a greater groove surface area for a fluid pressure to act upon. In the preferred embodiment, the depth of the groove 52 is approximately two-thirds of the axial length (L) of the overall seal 40. Likewise, the relationship between the thickness (T) of the annular seal to its axial length (L) should be such as to ensure facility of deformation due to a minimum threshold of pressure differential across the seal 40. In the preferred embodiment, the ratio of (T):(L) is 1:5.

In operation, if the inner magnet chamber housing 20 should rupture and fluid should rush from the area of the rotor blades 12 into the space surrounding the rotatable shaft 32, the fluid will be forced into the V-shaped groove 52 of the seal 40. The action of the fluid pressure within the V-shaped groove 52 forces the groove to widen which, in turn, forces the inner cylindrical surface 47 of the seal 40 to engage the rotatable shaft 32 along a substantial length of the seal. The wedging force of the liquid rushing into the groove 52 is directly applied to the shaft 32 because the seal is relatively immovable in the outward radial direction due to the rigid support provided by the cylindrical surface defining recess 25 of bushing 22. Therefore, the reaction of forces in the outer radial direction act to forcibly clamp surface 47 of the seal 40 onto the shaft 32. The outward radial force also prevents the seal from rotating within recess 25 and further comprises a sealing force which is directly proportional to the fluid pressure differential across the seal 40.

The drag force on the shaft 32 created by the engagement of the cylindrical surface 47 with the surface of the shaft 32 causes the shaft to significantly slow down or even to freeze. The indicator in the face of the direct reading meter is correspondingly effected by the friction so applied to the shaft 32 as to indicate to one monitoring the meter that the inner magnet chamber housing has been ruptured and that the sealing device has been actuated. The overall direct reading meter may then be disconnected from the line carrying the fluid to be flow-monitored and the escape of the fluid through the metering device may, thus, be averted.

Since the shaft may be frozen by the action of the seal, the absence of moving parts make it less likely that the seal 40 may, itself, rupture after an extended period of time. It will be noted, that the usage of such a seal 40 thereby not only protects the environment contiguous to the meter from damage due to contaminant leakage, but also preserves the delicate tachometer mechanism from extensive damage because fluid is prevented from entering the tachometer chamber.

It can thus be seen that a device has been herein provided for preventing a stream of fluid, which is being flow-rate monitored, from leaking from a flow meter and contaminating the area surrounding the meter. Likewise, when installed within a direct reading flow meter, the seal herein provided precludes erroneous readings due to friction, during normal operation, in that only a line contact is permitted between the device and the rotatable shaft of the meter.

Further, the device herein provided serves to indicate (i.e. by an abnormally low reading) to one monitoring a direct flow meter that the inner magnet chamber has been ruptured, and that liquid has actuated the sealing device so as to cause a pressure differential thereacross. The dimensions disclosed in connection with the preferred embodiment ensure that a fluidtight seal will be created upon the formation of a minimum threshold of pressure differential across the seal. The configuration of the seal 40 is such that it is easy to manufacture and since it need not be compressed before being fit within the bushing of a direct reading flow meter, the installation of the sealing device is likewise facilitated.

While what has been shown and discussed in the foregoing description is the preferred embodiment of the present invention, it is, of course, understood that various changes and modifications may be made therein without departing from the spirit of the invention. It is therefore intended to include in the appended claims all such modifications and changes as may fall within the true spirit and scope of the present invention.

What I claim and request by Letters Patent of the United States is:

1. A resilient seal comprising:
  a. a hollow, generally cylindrical body having a width approximately one-fifth the axial length of said resilient seal;
  b. a cylindrical inner surface extending parallel with the axis of said body;
  c. an annular bead formed on said cylindrical inner surface adjacent a first axial end of said body;
  d. an annular V-shaped groove formed longitudinally within said body and extending axially from said first axial end through approximately two-thirds the distance of the axial length of said seal;
  e. a generally cylindrical outer surface of said body;
  f. said generally cylindrical outer surface of said body extending parallel with the axis of said body from a second axial end thereof to an approximate midpoint between said first and said second axial ends of said body; and
  g. said generally cylindrical outer wall surface being divergent with respect to the axis of said body from said midpoint axially to said first axial end of said body.

2. The resilient seal of claim 1 wherein said hollow, generally cylindrical body consists of rubber.

3. The resilient seal of claim 1 wherein said generally cylindrical outer wall surface is divergent with respect to the axis of said body from said midpoint axially to said first axial end of said body at a slope of approximately 0.05 inches per inch of axial length.

4. The resilient seal of claim 1 with the addition of a rotatable shaft disposed axially through said body:
  a. the axis of said rotatable shaft being coincident with the axis of said generally cylindrical body;
  b. said hollow, generally cylindrical body being in frictional contact with said rotatable shaft only along a contact line between said annular bead formed on said cylindrical inner surface adjacent said first end of said body and an outer surface of said rotatable shaft.

5. An apparatus according to claim 4 wherein said seal and said shaft are disposed within an inner magnet chamber housing of a direct reading flow meter and wherein:
  a. said annular V-shaped groove formed in said body and extending axially from said first end of said body is formed so that a narrow end thereof is adjacent said second end of said seal;
  b. said narrow end of said V-shaped groove is formed as an apex of two converging annular walls of said V-shaped groove; and
  c. whereby said inner surface of said hollow cylindrical body may be forced against said rotatable shaft along a substantial axial length of said inner surface in response to an application of differential pressure across said seal.

6. An apparatus according to claim 5 wherein said inner magnet chamber housing is formed with an internal annular recess and wherein:
  a. a first axial end of said annular recess is adapted to receive said second axial end of said body of said seal;
  b. a second axial end of said annular recess is defined by an annular shoulder adapted to abut said second axial end of said body when said seal is forced thereagainst.